United States Patent Office 2,802,027
Patented Aug. 6, 1957

2,802,027

PLANT GROWTH REGULANT

Van R. Gaertner, Dayton, Ohio, assignor to Monsanto Chemical Company, St. Louis, Mo., a corporation of Delaware No Drawing. Application March 16, 1955,
Serial No. 494,809

2 Claims. (Cl. 260—505)

This invention relates to 2-(arylmercapto)-1-alkanesulfonates, to methods of preparing the same, and to the use of these new compounds as plant growth hormones.

The compounds of the invention are prepared by reacting an isethionic compound with an arenethiol, substantially according to the scheme

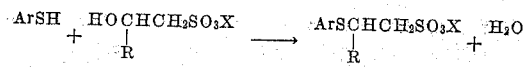

where R is selected from the class consisting of hydrogen atoms and alkyl radicals of from 1 to 5 carbon atoms, Ar is selected from the group consisting of alkylphenyl, halophenyl, and naphthyl radicals, and X is selected from the group consisting of alkali metals, alkaline earth metals, and ammonium. (The term arenethiol is here used to mean an aromatic ring attached to a mercaptan, SH, group, and is derived in analogy to the term alkanethiol.)

Isethionates which may be condensed with arenethiols to prepare the present arylmercaptoethanesulfonates are, for example, salts of isethionic acid, such as sodium isethionate, potassium isethionate, magnesium isethionate, calcium isethionate, ammonium isethionate, etc. Other isethionate compounds which may be used in preparing the ethanesulfonate of the invention are salts of 2-alkyl-isethionic acids, e. g., sodium 2-methylisethionate, potassium 2-ethylisethionate, lithium 2-propylisethionate, barium 2-isopropylisethionate, calcium 2-n-butylisethionate, ammonium isoamylisethionate, etc. The isethionates and 2-alkylisethionates are readily prepared by the reaction of an alkali metal or alkaline earth metal bisulfite with ethylene oxide, propylene oxide, or an alkyloxirane having up to 5 carbon atoms in the alkyl radical.

The arenethiols which are useful in preparing the compounds of the invention comprise the benzenethiols in which the benzene ring carries a substituent. Examples of alkylbenzenethiols which undergo this reaction are o-, m-, and p-toluenethiol, 2,3-, 2,4-, 2,5-, 2,6-, 3,4-, and 3,5-xylenethiol, o-, m-, and p-ethylbenzenethiol, o-, m-, and p-isopropylbenzenethiol, etc. Halobenzenethiols which are suitable reactants for preparing the present ethanesulfonates are, e. g., o-, m-, and p-chlorobenzenethiol, o-, m-, and p-bromobenzenethiol, 2,4-dichlorobenzenethiol, 2,4,5-trichlorobenzenethiol, pentachlorobenzenethiol, etc. The isethionates listed above will also react in accordance with the process of the invention with 1- or 2-naphthalenethiol and its substitution products (the naphthalenethiols may be considered to be benzenethiols in which the phenyl radical is substituted by an unsaturated bivalent hydrocarbon radical fused to the benzene ring at two adjacent positions). Examples of substituted naphthalenethiols reactive with isethionates to prepare the compounds of the invention are, e. g., 4-chloro-2-naphthalenethiol, 8-chloro-1-naphthalenethiol, 1,2,3,4-tetrahydronaphthalene - 2 - thiol, 4 - methyl - 2 - naphthalenethiol, etc.

Arylmercaptoethanesulfonates provided by the present invention include sodium 2-(2-naphthylmercapto)ethanesulfonate, sodium 2-(o-, m-, and p-chlorophenylmercapto)ethanesulfonate, sodium 2-(o-, m-, and p-tolylmercapto)ethanesulfonate, ammonium 2-(o-, m-, and p-chlorophenylmercapto)ethanesulfonate, ammonium 2-(2,3-, 2,4-, 2,5-, 2,6-, 3,4-, and 3,5-xylylmercapto)ethanesulfonate, potassium 2-(2-naphthylmercapto)ethanesulfonate, sodium 2-(2-naphthylmercapto)-1-propanesulfonate, sodium 2-(o-, m-, and p-chlorophenylmercapto)-1-propanesulfonate, sodium 2-(o-, m-, and p-tolylmercapto)-1-propanesulfonate, sodium 2-(2,3-, 2,4-, 2,5-, 2,6-, 3,4-, and 3,5-xylylmercapto)-1-propanesulfonate, sodium 2 - (2,4 - dichlorophenylmercapto) - 1 - propanesulfonate, ammonium 2 - (2 - naphthylmercapto) - 1 - propanesulfonate, sodium 2-(2-naphthylmercapto)-1-butanesulfonate, potassium 2-(o-, m-, and p-chlorophenylmercapto) - 1 - butanesulfonate, sodium 2 - (o-tolylmercapto)-1-pentanesulfonate, calcium 2-(2-naphthylmercapto) - 1 - hexanesulfonate, sodium 2 - (o-, m-, and p - tolylmercapto) - 1 - heptanesulfonate, calcium 2-(o-, m-, and p-chlorophenylmercapto)-1-pentanesulfonate, etc. The above compounds may also be converted to the free acids, e. g., 2-(2-naphthylmercapto)-1-ethanesulfonic acid, 2-(o-tolylmercapto)-1-propanesulfonic acid, etc.; however, because of the convenience of the water solubility of the present alkali salts, the more ready availability of the salts, etc., I prefer to utilize the present acids in the form of their salts.

To prepare the present arylmercaptoethanesulfonate, I heat a mixture of the isethionate and arenethiol at temperatures, say, of 150° to 300° C., until formation of the arylmercaptoethanesulfonate has occurred. Since the reaction takes place by condensation of one mole of the isethionate with one mole of arenethiol, advantageously equimolecular proportions of each reactant are employed; however, if desired, an excess of the more readily available component may be used, to assure complete reaction of the less readily available component. Excess reactant can then be removed at the end of the reaction by extraction, distillation, etc. If desired, the reaction may be carried out at sub- or super-atmospheric pressures. Diluents and solvents are not necessary, but may be used, for example, to facilitate stirring the reactants. Examples of useful diluents are high-boiling hydrocarbons, such as dodecylbenzene, kerosene, etc. While a catalyst for the reaction is necessary only in certain cases, generally the reaction is facilitated by the presence of a condensation catalyst, e. g., a basic compound such as an amine or an alkali metal hydroxide. Suitable catalysts for the reaction are, for example, sodium, potassium, or lithium hydroxide, ammonium hydroxide, sodium carbonate, sodium methylate, calcium hydroxide, etc. Organic bases such as pyridine, triethanolamine, etc., may also be be used as catalysts. The basic compound is added to the reactants in catalytic amounts, i. e., to the extent of 0.1 to 2 percent by weight of the reactants. Generally, the reaction is completed within 20 minutes to a few hours.

The 2-(arylmercapto)-1-alkanesulfonates prepared by the present process are generally well-characterized, high-melting, water-soluble crystalline solids. They are useful for a variety of industrial and agricultural purposes, e. g., as intermediates in the preparation of medicinals and rubber chemicals, as catalysts, as surface-active agents, etc. They are particularly valuable biological toxicants; they possess plant growth hormone properties, and may be used to modify and repress the growth of undesired vegetation.

The invention is further illustrated, but not limited, by the following examples:

*Example 1*

A mixture of 26.6 g. (0.18 mole) sodium isethionate and 32 g. (0.2 mole) 2-naphthalenethiol was placed in a flask equipped with a stirrer and a take-off condenser. The mixture was heated, with stirring, the temperature rising from 170° to 265° C. within one-half hour, during which time, about one ml. of water was collected. The viscous reaction product was then removed from the flask while still hot and washed twice with acetone, to remove unreacted naphthalenethiol. On drying, 47.5 g. (81.8 percent yield) of crude sodium 2-(2-naphthylmercapto)-1-ethanesulfonate were obtained. A portion of this material was further purified by treating a solution of it in hot water with charcoal, followed by filtration and precipitation; after two such treatments and drying under vacuum, the product was obtained as pure white platelets, which melted with decomposition at 280–300° C. Analysis gave a value of 22.22 percent sulfur for this material, as against a theoretical value of 22.1 percent sulfur.

*Example 2*

A mixture of 41 g. (0.3 mole) o-toluenethiol and 44.4 g. (0.3 mole) sodium isethionate mixed with 1.0 g. sodium hydroxide was placed in a reaction flask as described in Example 1, and heated with stirring. The temperature rose from 167° to 210° C. within 1⅓ hours, during which time 4 ml. of water were collected. The product was removed from the flask, treated with acetone, filtered, washed repeatedly with acetone, and dried, giving a yield of 65.5 g. of crude 2-(2-tolylmercapto)-1-ethanesulfonate. Further purification of a small sample of the sulfonate was effected by boiling in water, cooling, and filtering, redissolving in water and precipitating with ethanol, then recrystallizing from water and drying under vacuum, giving the substantially pure compound as white plates which melt with decomposition, and analyze as follows:

|           | Found | Calculated for $C_9H_{11}NaO_3S_2$ |
|-----------|-------|-----------------------------------|
| Percent C | 41.5  | 42.4 |
| Percent H | 5.15  | 4.37 |

An attempt to prepare the 2-(o-tolylmercapto)-1-ethanesulfonate by heating sodium isethionate and o-toluenethiol in the absence of sodium hydroxide at atmospheric pressure gave back unchanged starting material.

*Example 3*

A mixture of 31.8 g. (0.22 mole) p-chlorobenzenethiol, 79.6 g. (0.20 mole) sodium isethionate, and 2.0 g. sodium hydroxide was stirred and heated in 25 ml. dodecylbenzene while the temperature of the mixture was raised from 155° to 250° C. during the course of 1½ hours. The product was thoroughly agitated with acetone, filtered, washed three times with acetone, and dried, giving 48.5 g. of light-colored 2(-p-chlorophenyl-mercapto)-1-ethanesulfonate. A portion of the product was further purified by three recrystallizations from water preceded by charcoal treatment and filtration, giving white matted needles which sintered at 260° C. and decomposed at 290–330° C., and analyzed as follows:

|           | Found | Calculated for $C_8H_8ClNaO_3S_2$ |
|-----------|-------|-----------------------------------|
| Percent C | 35.52 | 35.0 |
| Percent H | 3.38  | 2.93 |

Similarly, sodium 2-(2-naphthylmercapto)-1-propanesulfonate is prepared from 2-naphthalenethiol and sodium 2-hydroxy-1-propanesulfonate; sodium 2-(2,4-dichlorophenylmercapto)-1-ethanesulfonate is prepared from 2,4-dichlorobenzenethiol and sodium isethionate, etc.

The compounds of the invention have been found to possess hormone-like activity towards plants. The plant growth hormones, of which indoleacetic acid is the most readily available of the three known naturally occurring auxins, act to control plant growth in a variety of fashions. Synthetic plant growth hormones have been used, e. g., as contact sprays for selective herbicidal action, for growth-suppression, to produce defoliation, etc.; they have also been incorporated in soils to produce selective soil sterilization. Growth promoting action which has been observed to be produced by synthetic plant growth hormones includes stimulation of cell elongation, initiation of roots, induction of parthenocarpy, modification of organs, etc. Generally, the plant growth hormones produce modification of plant growth when applied in low concentrations, i. e., from above 0.1 to 1 percent by weight, and herbicidal effects, which may be selective, when applied at higher concentrations, such as from about 1 percent to 10 percent by weight.

Compositions containing the compounds of the invention useful for plant growth regulating purposes include aqueous compositions, emulsions, and dusts. Since the compounds of the invention are generally water-soluble, aqueous solutions of them can be prepared easily and conveniently, and such aqueous solutions may readily be used for application to plants or soils. Another convenient form for application of the arylmercaptoethanesulfonates of the invention is as a mixture of the active compounds with powdered solid carriers, e. g., talc, bentonite, diatomaceous earth, calcium carbonate, etc. If desired, a dispersing or wetting agent may be added to the solution or dust; generally, the amount of arylmercaptoethanesulfonate which need be applied per plant to produce a given effect is decreased when wetting agents are present. When dusts are to be used, a wetting agent also converts the solid material into a wettable powder, which may be applied directly to the plants, or may be used to prepare an aqueous suspension for use in application to the plants. Examples of suitable wetting agents, are, e. g., soaps such as sodium laurate, polyglycol monoethers with long chain fatty alcohols, such as the reaction products of oleyl alcohol and excess ethylene oxide, cationic surface-active agents such as trimethylcetylammonium iodide, etc.

Testing of the present arylmercaptoethanesulfonate for plant growth regulant and herbicidal activity was carried out as follows:

*Example 4*

An aluminum pan flat filled with a mixture of two parts top soil which had been screened through ¼" wire mesh and one part sand was randomly seeded over one-third of its surface with grass and corn seeds, and over the remaining two-thirds of its surface with seeds of broad-leaf plants. The seeds were then covered with a ⅜" layer of soil, and the seeded pan was sprayed with 30 cc. of an aqueous solution containing 1 percent liquid fertilizer, to supply an adequate nutrition level, and 0.1 percent octamethyl pyrophosphate, to protect the plants against insect infestation. The pan was then sprayed with an aqueous solution of 0.2 g. of sodium 2-(2-naphthylmercapto)-1-ethanesulfonate in 30 ml. of water, after which the pan was placed in ½" of water and allowed to absorb moisture through the perforated bottom until the soil surface was completely moist. The pan was then kept on a wet sand bench in a greenhouse for ten days, after which the plant growth was observed and recorded, giving the data shown in the table below:

PRE-EMERGENCE TESTING

| Plant | Rating | Plant | Rating | Plant | Rating |
|-------|--------|-------|--------|-------|--------|
| Cheat Grass | 3 | Mustard | 2 | Moss Rose | 1 |
| Wild Oat | 2 | Buckwheat | 1 | Cotton | 0 |
| Rye Grass (Dom.) | 2 | Red Clover | 1 | Sugar Beet | 0 |
|  |  | Cucumber | 1 | Corn | 0 |

The ratings above are based on the number of seedlings emerging as compared to expected percent germination for each type of seed. In the scale, a rating of 3 indicates that substantially none of the seedlings of the species emerged, whereas a rating of 0 indicates that the compound has no perceptible phytotoxic effect in the maturation of the young plants. The high selectivity of the herbicidal effects of the present compound is evident from the above data, showing that corn, for example, is completely unaffected by the pre-emergent treatment and matures normally, whereas cheat grass fails entirely to grow in the same environment.

*Example 5*

A pan containing two-week-old grasses and two individual bean plants each with one mature trifoliate and one partially opened trifoliate were sprayed with an aqueous solution containing 0.5 percent by weight of sodium 2-(2-naphthylmercapto)-1-ethanesulfonate, and the plants were then set in a greenhouse for ten days. At the end of this time, it was found that, whereas the grasses were substantially unaffected by the treatment with the sulfonate, the growth of the bean plants had ceased, and the tip of the affected bean plants exhibited gall formation, which is a typical morphological effect of plant hormones.

Sodium 2-(p-chlorophenylmercapto)-1-ethanesulfonate, sodium 2-(o-tolylmercapto)-1-ethanesulfonate, etc., similarly exhibit highly selective plant response activity. Typical compositions for application to soils are, e. g.:

*Example 6*

| | Parts by weight |
|---|---|
| Sodium -2-(p - chlorophenylmercapto)-1 - ethanesulfonate | 1 |
| Santomerse (Monsanto Chemical Co., St. Louis, Missouri) | 1 |
| Talc | 98 |

*Example 7*

| | |
|---|---|
| Sodium 2-(o-tolylmercapto)-1-ethanesulfonate | 2 |
| Water | 998 |

Other variations in the compositions of the invention, in accordance with the description above, may be readily made by those skilled in the art. The new compositions are generally applicable as herbicides, such as in pre-emergence or pre-planting practices for the control of weeds, or in post-emergence treatment for the control or destruction of weeds, in the presence of such useful crops to which the formulation exhibits slight or no herbicidal action.

I claim:

1. A 2-(halophenylmercapto)-1-alkanesulfonate salt of the formula

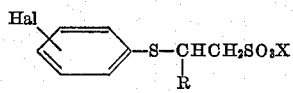

in which R is selected from the class consisting of hydrogen and alkyl radicals of from 1 to 5 carbon atoms, X is selected from the class consisting of alkali metal, alkaline earth metal, and ammonium, and Hal is a halogen atom selected from the class consisting of chlorine and bromine.

2. Sodium 2-(p-chlorophenylmercapto)-1-ethanesulfonate.

References Cited in the file of this patent

UNITED STATES PATENTS

| 2,412,510 | Jones | Dec. 10, 1946 |
| 2,453,983 | Sexton et al. | Nov. 16, 1948 |
| 2,480,859 | Hollander | Sept. 6, 1949 |
| 2,573,769 | Lambrech | Nov. 6, 1951 |